US007899841B2

(12) United States Patent
Otter et al.

(10) Patent No.: US 7,899,841 B2
(45) Date of Patent: Mar. 1, 2011

(54) REUSE OF BUSINESS LOGIC OF REPORTS AS DATA SOURCES

(75) Inventors: Wolfgang Otter, Spechbach (DE); Ingo Raasch, Hockenheim (DE); Faiko Schneider, Sinsheim (DE); Michelle Braun, Bammental (DE)

(73) Assignee: SAP AG, Walldorf (DE)

( * ) Notice: Subject to any disclaimer, the term of this patent is extended or adjusted under 35 U.S.C. 154(b) by 363 days.

(21) Appl. No.: 11/835,278

(22) Filed: Aug. 7, 2007

(65) Prior Publication Data
US 2009/0043735 A1 Feb. 12, 2009

(51) Int. Cl.
G06F 17/30 (2006.01)
(52) U.S. Cl. .................. 707/769; 707/605; 707/810
(58) Field of Classification Search .......... 707/1, 707/3, 5–6, 100, 102, 103 Z, 200, 600, 694, 707/702, 703, 756, 791, 802, 804–805, 810, 707/759, 769, 796
See application file for complete search history.

(56) References Cited

U.S. PATENT DOCUMENTS

| 5,630,122 | A | * | 5/1997 | Kaplan et al. | 707/769 |
|---|---|---|---|---|---|
| 6,341,286 | B1 | * | 1/2002 | Kawano | 1/1 |
| 6,360,246 | B1 | * | 3/2002 | Begley et al. | 709/203 |
| 6,397,207 | B1 | * | 5/2002 | Bleizeffer et al. | 1/1 |
| 6,721,745 | B2 | * | 4/2004 | Monestere, III | 1/1 |
| 6,750,766 | B1 | * | 6/2004 | Heitner et al. | 340/525 |
| 6,772,409 | B1 | * | 8/2004 | Chawla et al. | 717/106 |
| 6,993,533 | B1 | * | 1/2006 | Barnes | 1/1 |
| 2003/0172082 | A1 | * | 9/2003 | Benoit et al. | 707/101 |
| 2003/0233343 | A1 | * | 12/2003 | Li | 707/1 |
| 2004/0267595 | A1 | * | 12/2004 | Woodings et al. | 705/9 |
| 2005/0015361 | A1 | * | 1/2005 | Payton et al. | 707/3 |
| 2005/0039033 | A1 | * | 2/2005 | Meyers et al. | 713/193 |
| 2005/0163304 | A1 | * | 7/2005 | Judkins et al. | 379/265.02 |
| 2005/0228803 | A1 | * | 10/2005 | Farmer et al. | 707/100 |
| 2006/0130063 | A1 | * | 6/2006 | Kilian et al. | 718/100 |
| 2006/0265641 | A1 | * | 11/2006 | Garfinkle et al. | 715/515 |
| 2007/0179975 | A1 | * | 8/2007 | Teh et al. | 707/104.1 |
| 2007/0203935 | A1 | * | 8/2007 | de Souza | 707/102 |
| 2007/0276804 | A1 | * | 11/2007 | Khan et al. | 707/3 |

FOREIGN PATENT DOCUMENTS

WO    WO 2005/006213    *    1/2005

OTHER PUBLICATIONS

Camille Rogers, et al. "ABAP Objects: Designing a Programming Course for Information Systems Students Using SAP Software", Issues in Information Systems, vol. IX, No. 1, 2008, pp. 165-167.*

* cited by examiner

Primary Examiner—Srirama Channavajjala
(74) Attorney, Agent, or Firm—Mintz, Levin, Cohn, Ferris, Glovsky and Popeo, P.C.

(57) ABSTRACT

An InfoSet API calls a query, the call defining selections for data retrieval. These selections are passed by the query to a report, which obtains data responsive to the selections via a data source. The obtained data is persisted in a global memory which allows such data to be accessed in multiple sessions. The persisted data is retrieved from the global memory by the query which in turns provides such data in response to the InfoSet API call. Techniques for automatically creating aspects of Infosets are also described as well as other related techniques, apparatus, systems, and articles.

17 Claims, 3 Drawing Sheets

REUSE OF BUSINESS LOGIC OF REPORTS AS DATA SOURCES

TECHNICAL FIELD

The subject matter described herein relates to the reuse of historical underlying business logic of reports when deploying software solutions.

BACKGROUND

The development of large software solutions typically requires the reuse of software. This is especially the case when the user interface for software is modified to be compatible with, for example, a new operating system. In some development environments, software is generated based on pre-existing building blocks which can later be reused. However, in other environments, monolithic programs are generated, and reuse of portions of such programs can require significant programming effort. In either case, when generating a new user interface, the business logic often remains the same, thereby necessitating reuse of pre-existing software.

SUMMARY

In one aspect, a query is called by an API that defines selections for data retrieval. The query passes the selections to a report, which in turn, obtains data responsive to the selections received from the query via a data source. The obtained data is persisted in a global memory which allows such data to be accessed in multiple sessions. The persisted data is retrieved from the global memory by the query to allow the query to responds to the API call using the persisted data retrieved from the global memory.

Numerous variations may be implemented singly or in combination dependent on the desired configuration. For example, the report can be an ABAP report, the query and/or the report can be called via a dark call, the API call can bypass a selection handling component in the query, data responsive to the API call can be presented to a user, the API can be for an InfoSet which may optionally use a data dictionary to characterize how the data is to be presented in the report, and the API can provide metadata of a report and execution of business logic.

In another interrelated aspect, execution of a report is initiated with the output of the report being pre-defined and based on provided selections. During execution of the report, ALV metadata is computed. A portion of the ALV metadata (e.g., the non-relevant portion) is deleted to suppress presentation of an associated result list. Thereafter, a structure for an InfoSet is generated based on remaining non-deleted ALV metadata. Suggestions for the InfoSet are generated based on the generated structure and an analysis of a selection screen of the report. Thereafter, the InfoSet is generated based on the generated structure and the generated suggestions and a query is generated that displays all fields of the InfoSet.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current techniques allow for a more efficient reuse of software as compared to conventional software. In some implementations, the subject matter described herein allows for the creation of new user interfaces for data reports and/or to use data reports as a data source (e.g. for a Business Warehouse, etc.).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
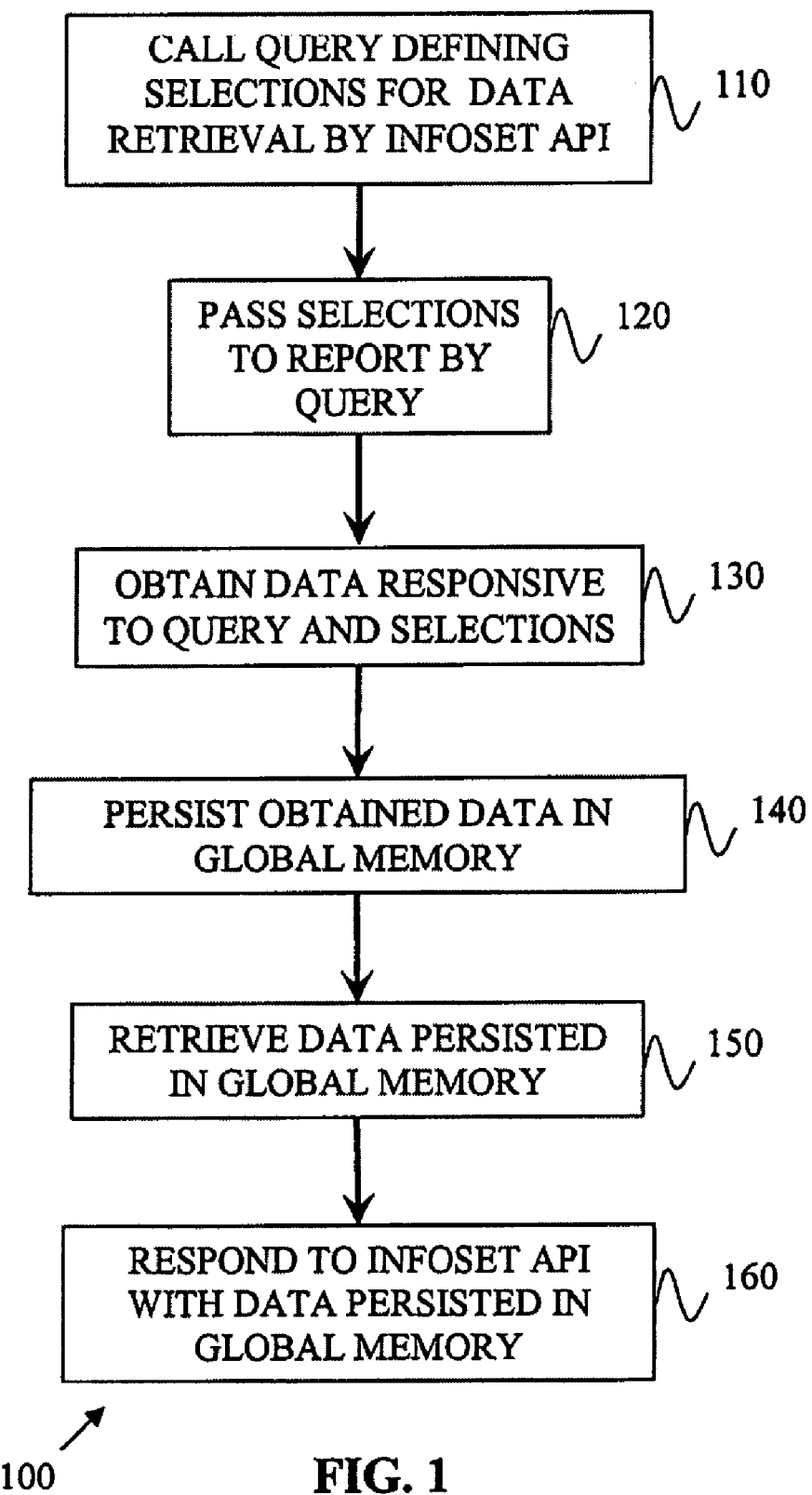
FIG. 1 is a process flow diagram illustrating a method of reusing business logic.

FIG. 1 is a process flow diagram illustrating a method 100 in which, at 110, an API calls a query, the call defining selections for data retrieval. Thereafter, at 120, the query passes the selections to a report. The report then, at 130, obtains data responsive to the selections received from the query via a data source. The obtained data is persisted, at 140, in a global memory. The global memory persisting the data to enable it to be accessed in multiple sessions. The query, at 150, retrieves the persisted data from the global memory so that the query can respond, at 160, to the API call.

While the following is described in connection with data reports generated by SAP AG software, it will be appreciated that the underlying techniques are applicable to the reuse of software in a variety of scenarios.

A report as described in connection with the examples below can be characterized as a classical R/3 report if it is written in the programming language ABAP, it needs the SAP GUI for execution and it reads data from a data source, processes and displays the data in a result list.

Each classical R/3 report can contain the following components.

Selection screen. On a selection screen selection criteria can be entered. The user can thus determine the amount of data to be processed (e.g., 2002-2006 aggregate sales data, North America sales data, etc.). The ABAP language supplies statements for defining the layout of the selection screen, implementing value helps, checking validity of entered values and reacting on errors. A selection screen can be a special dynpro (e.g., an application called by a user interface) that is processed by SAP GUI.

Code for data retrieval (business logic). In accordance with the selection criteria, data is retrieved from the required data sources and combined into one internal result table. The ABAP language supplies statements for defining the data retrieval process (e.g. Open SQL and event statements).

Presentation of the result. The retrieved data is handed over to an output media. If the output is done with help of the ALV (see below) a corresponding call has to be prepared and executed. The call requires both data and metadata.

Code for handling interactions. In many cases interactions are possible on the displayed result. The ABAP language supplies statements for handling such interactions.

A report can consist of various parts (e.g. data retrieval, data preparation, presentation, etc.). A logical and physical separation is missing. Therefore these parts cannot be accessed individually. The report must be called as a whole.

The result can be displayed in various ways: either by using the standard ABAP list technique, standard GUI control table or by using the ALV (SAP List Viewer) component. ALV is an output medium for displaying tabular data which has, in some implementations, displaced the native ABAP list technique and GUI table control. There are several variants of ALV (function modules and classes). ALV is able to present two kinds of lists, namely flat lists (tables), and hierarchically sequential lists (head—item—lists)

An important characteristic of a report is the so called dark call. The dark call is the call of a report without using the SAP GUI. This means that neither selection screen nor result list is presented on a screen. With a dark call, the selections have to be transferred to the report during the call. For this ABAP provides extensions for the call (statement SUBMIT). All relevant checks are performed and in case of errors the call is aborted. In addition, the result list is written into a file (spool data) that allows for later processing (e.g. printing, etc). The dark call of reports is the prerequisite for calling reports in the batch mode.

The InfoSet Query (also called SAP Query) is a tool for creating simple reports in a descriptive way, i.e. a query (a report) is defined without programming effort by simply enumerating the selections and describing the layout. The definition of queries is based on InfoSets. An InfoSet is the description of a data source and provides metadata for the definition of queries. An InfoSet can contain a structure from a Data Dictionary, a list of fields which are contained in the structure and which can be used for the definition of queries (not all fields contained in the structure have to be used), a list of selections, which are to be used in each query including the required checks (as ABAP code) and a description of the data retrieval.

The Data Dictionary is a data management system (DMS) that can perform tasks including: management of all data definitions (metadata); provision of information for evaluations; management of underlying support for software development; provision of support for documentation; and ensuring data definitions are reliable, flexible and current.

The goal of the data retrieval is to combine the result into one internal table. The data retrieval can be described in different ways. Normally no programming is necessary. But for the subject matter described herein, data retrieval can be described by using ABAP code—with a so called data retrieval program.

In contrast to a query which is defined on top of an InfoSet, an InfoSet can also contain coding. It is possible to create an arbitrary number of queries on top of an InfoSet. All these queries use the data retrieval which is defined in the InfoSet. They differ in the number of used fields and in the layout. The query tool generates a report using the query and InfoSet definition. This report has the same structure as a classical R/3 report (as described above).

A special API (InfoSet API) can be adopted for InfoSets and queries. Such an API can allow the individual parts of a query to be called separately. It may be possible to call only the selection screen, only the data retrieval or only the output of a query. This feature is realized by a special structure of generated reports.

The call of an individual part requires that the results of the preceding step are available (i.e., the individual call of the data retrieval requires the selection criteria and the individual call of the output requires the data which is to be shown). With such an InfoSet API, queries can be used as data sources (e.g. for the SAP business warehouse). As the definition of a query is possible without programming, the definition of such a data source is also possible without programming.

A prerequisite to reusing business logic of reports is that the data retrieval of a report can solely be called (i.e., without presenting the selection screen nor the result list on the screen). According to the target, the report itself may not be subject of modifications.

Figure 2:
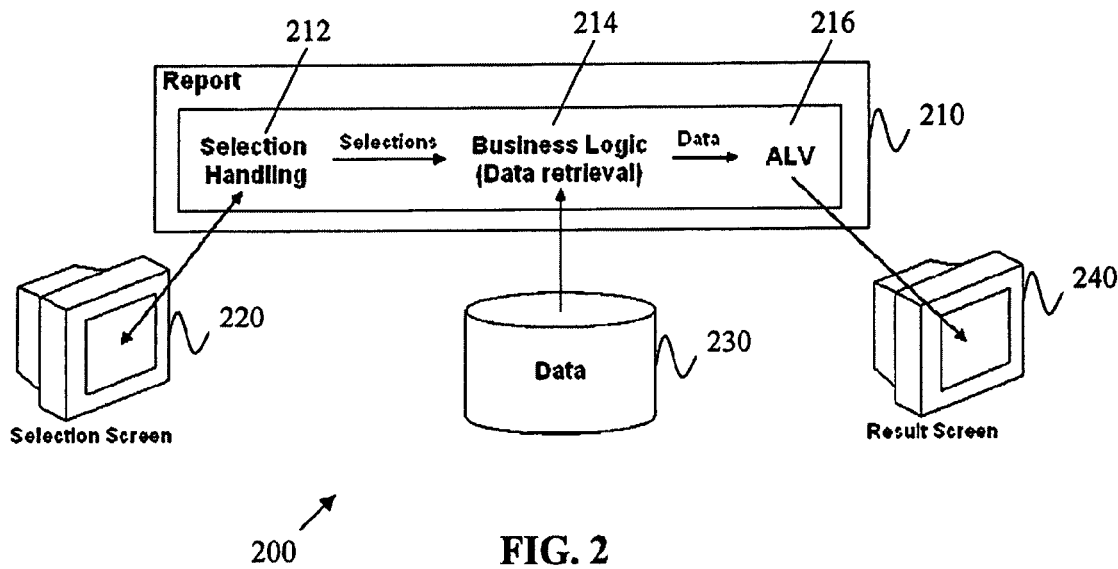
FIG. 2 is a diagram illustrating generation of a report based on retrieval of data from a data source.

FIG. 2 is diagram 200 illustrating generation of a report 210 based on retrieval of data from a data source 230. The report can contain components selection handling 212, business logic 214, and ALV 216, and such components are typically not separated physically and logically. Via a selection screen (i.e., a user interface) 220, a user conducts selection handling 212 to select the amount of data to be processed in a resulting report 210. Once the user has made its selections, pre-defined business logic 214 causes data to be retrieved from the data source 230 to generate a result table. The retrieved data is then provided to an output media such as an ALV 216 for eventual presentation to the user on a result screen (i.e., a user interface) 240.

The following describes requirements to exclusively call the data retrieval are listed, and options how to meet these requirements are mentioned. With the following, it is assumed that such a call is executable by a generic application, i.e. a separate solution for each report is not necessary.

As a prerequisite, a separate call of the business logic of a report by a generic application is required. Such a report must support dark processing (as described above). In addition, both the number and the type of the selections must be known (the selections must be propagated to the data retrieval), and the ABAP language and special function modules must support the analysis of selection screen.

Furthermore, techniques to access the retrieved data and that the metadata (name, type and properties of the contained fields) are provided. Depending on the type of output, different solutions are necessary. It is important that providing data and metadata is not initiated by a parameter of the report itself, but must be initiated completely externally, i.e. from outside the report and its execution (otherwise, the report would have to be changed to allow providing the data and metadata as described above).

Using the ALV can provide several advantages. First, when calling the ALV, both data and metadata have to be propagated to the ALV. Therefore, the metadata required for external access is available automatically. The caller of the ALV has several possibilities to specify the metadata. The easiest possibility is to use a structure of the Data Dictionary. Second, the ALV call can be configured in such a manner that data and metadata are stored in a global memory area which can later be accessed outside of ALV. Third, when calling the ALV it is possible to stop processing after storing the data and metadata, so that the presentation of the result list is suppressed. The ALV can be configured so that presentation of the result is suppressed after data and metadata have been stored in the global memory area.

Within a main session, when an application program is started, it opens up an internal sessions within the main session. The internal session has a memory area (referred to as ABAP memory) that contains the ABAP program and its associated data. The ABAP Memory can be used to pass data between two internal sessions (i.e import, export). If data is to be passed between two main sessions, the global memory is utilized. The global memory can also be used to pass data between internal sessions.

It must be determined how to tell the ALV that data and metadata are supposed to be stored, where to store them and whether to present the data or not. This may not be done by parameters of the report, as mentioned above. For cases like that, ABAP provides the global memory, where user specific information can be stored and the lifetime of which is longer than the program execution.

Before calling the report, a parameter in the global memory can be set. Once the ALV is called during the processing of the report, it can read that parameter and react accordingly. Using the same mechanism, both the data and the metadata can be stored in the memory.

A special class can be included in the programming environment of the ALV in order to support the passing (storage and retrieval) of parameters, data and metadata via the global memory.

With the above mentioned requirements fulfilled, an API can be designed that allows to reuse the business logic of reports. This API can provide the metadata of a report and the execution of the business logic. In some variations, InfoSets, queries and a conventional InfoSet API can be used. The conventional InfoSet API can provide several advantages. For example, in several applications, the InfoSet API is already used as a common view on different kinds of executable programs, e.g. as data source for business warehouse systems. These applications can thus use reports immediately. In addition, the InfoSet API offers the required infrastructure for the delivery of metadata of queries and/or the separate call of the data retrieval; this includes providing the data for later access.

Figure 3:
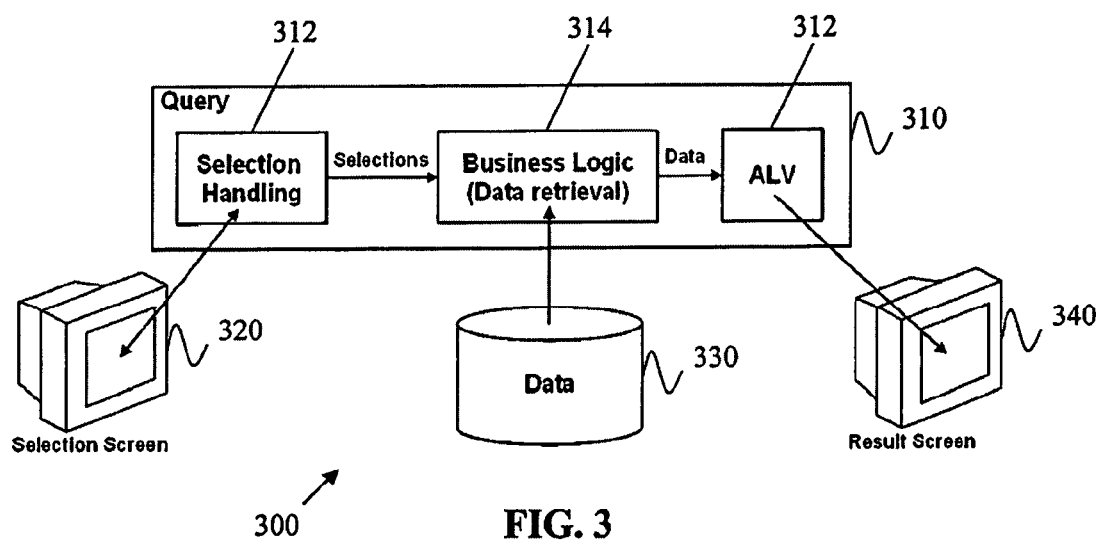
FIG. 3 is a diagram illustrating a query of data from a data source.

As described above, queries can have the same structure as reports. However, the components of a query have to be separated both physically and logically by special means. FIG. 3 is a diagram 300 illustrating a query 310 of data from a data source 330. Via a selection screen (i.e., a user interface) 320, a user conducts selection handling 312 to selects the amount of data to be processed in a resulting query 310. Once the user has made its selections, pre-defined business logic 314 causes data to be retrieved from the data source 330 to generate a result table. The retrieved data is then provided to an output media such as an ALV 316 for eventual presentation to the user on a result screen (i.e., a user interface) 340.

Figure 4:
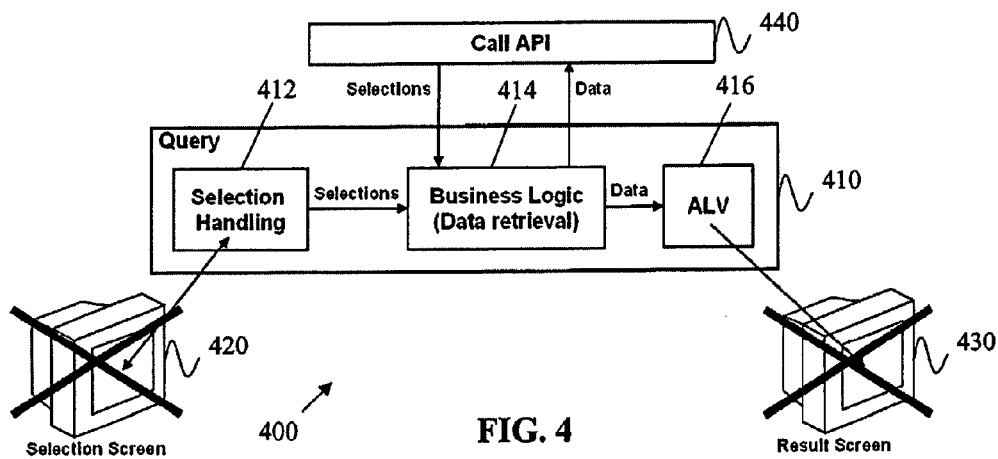
FIG. 4 is a diagram illustrating a call of a data retrieval component of a query via an InfoSet API.

FIG. 4 is a diagram 400 that illustrates a separated call of the data retrieval component 414 of a query 410 via an InfoSet API 440. With such an arrangement, it has to be ensured that the data retrieval 414 of the query 310 retrieves the data by calling the report with no UI (i.e., a selection screen 420 or a result screen 430 are not required or used). The data retrieval of a query is defined in the corresponding InfoSet.

The resulting general procedure for encapsulating a report by an InfoSet can comprise:
1. Defining a structure in the data dictionary that describes exactly the data presented by the report (via the ALV).
2. Defining an InfoSet that encapsulates the report.
   a. The InfoSet uses the previously defined structure.
   b. The field list of the InfoSet contains all fields of the structure.
   c. The selections of the InfoSet are defined so that they correspond to those of the report. Checks have to be defined that correspond to the checks of the report.
   d. The data retrieval in the InfoSet is realized as a data retrieval program that has the following structure:
      i. The selections of the InfoSet are collected in a selection table.
      ii. In the memory, the special call mode for the ALV is set.
      iii. The report is called darkly. The previously calculated selection table is transferred to the report. Due to the previously set call mode for that ALV, the ALV stores the result data in the memory and does not visualize the data.
      iv. After calling the report, the data is retrieved from the memory and stored in an internal table of the above mentioned structure.
3. Defining a query that contains all fields of the InfoSet. These are the fields that the report normally visualizes.
4. Calling the query via the InfoSet API in such a way that only the data retrieval is processed. The caller has to provide the selections.

The selections that are supposed to be transferred to the report for the dark execution have to be consistent and faultless, i.e. they have to pass the checks encoded in the report without any errors. Otherwise the report can raise errors, and such errors cannot be handled during the dark execution. Therefore, it may be necessary to re-encode these checks in the InfoSet. The above algorithm described here is valid and applicable for reports with a flat result list, however, hierarchical sequential lists require different treatment.

In the following, an InfoSet that has been created via this procedure will be called a Report InfoSet. The schema of this procedure is shown in diagram 500 in FIG. 5. With this arrangement, the query 510 delivers the same result as the report 560 when called with the same selections. However, with this procedure, there are some limitations of this procedure, including, for example:

The checks encoded in the report cannot be reused; they have to be re-encoded in the InfoSet.

The interactions of the report are neglected. The special call mode of the ALV causes the ALV to write data to the memory and stop further processing. Interactions are therefore not possible. Only the initially visualized data of the report will be delivered.

It is not possible to map different outputs of the report to one InfoSet. The output of some reports is structurally different, depending on the selections they have been started (executed) with. An InfoSet in contrast is always defined based on exactly one structure. A solution to this would be to encapsulate the report several times. The selections of the InfoSet then have to be organized in such a way that the selections transferred to the report always result in an output of the structure of that InfoSet.

The report may not raise any messages (ABAP key word MESSAGE), neither error nor success messages. When processing a report online, messages result in SAP GUI interactions. Calling the Query via the InfoSet API must be possible online; however the SAP GUI may not be used.

Furthermore it has to be remarked that the author of the InfoSet has to have knowledge about the report that is supposed to be encapsulated. If not, the author is not able to create neither the required structure in the Data Dictionary nor the required selections including the checks in the InfoSet. As described below, tools may be available for providing such knowledge.

The following sample report demonstrates the above described procedure. It shows how the data retrieval program of the InfoSet has to be structured. The sample report is an SAP report RMKKVZ00 that displays the supplier list. Although this report is rather simple with respect to selections and business logic, all crucial aspects can be demonstrated using this sample. The comments can be found below the example.

EXAMPLE 1

Supplier List (as a Report)

```
01 PROGRAM test.
02
03 TABLES test_structure.
04
05 DATA:  lfm1    TYPE lfm1,
06        lfa1    TYPE lfa1,
07        seltab TYPE TABLE OF rsparams,
08        t_data TYPE TABLE OF test_structure.
09
10 SELECT-OPTIONS:  i_lifnr FOR lfm1-lifnr,
11                  i_ekorg FOR lfm1-ekorg MEMORY ID eko,
12                  i_sortl FOR lfa1-sortl,
13                  i_ktokk FOR lfa1-ktokk.
14
15 CALL FUNCTION 'RS_REFRESH_FROM_SELECTOPTIONS'
16     EXPORTING curr_report    = sy-repid
17     TABLES    selection_table = seltab.
18 DELETE seltab WHERE kind   = 'S'
19                  AND sign   IS INITIAL
20                  AND option IS INITIAL.
21
22 cl_salv_bs_runtime_info=>clear_all( ).
23 cl_salv_bs_runtime_info=>set( display   = space
24                               metadata = space
25                               data      = 'X'
26                               structure = 'TEST_STRUCTURE' ).
27
28 SUBMIT rmkkvz00 WITH SELECTION-TABLE seltab
     AND RETURN.
29
30 TRY.
31    cl_salv_bs_runtime_info=>get_data( IMPORTING
       t_data = t_data ).
32 CATCH cx_salv_bs_sc_runtime_info.
33 ENDTRY.
34 cl_salv_bs_runtime_info=>clear_all( ).
35
36 BREAK-POINT.     "look at the content of t_data
```

The structure test_structure (line 3) is a data dictionary structure, which describes the output of the report RMKKVZ00.

The table seltab (line 7) may contain arbitrary selections of the selection screen. The table t_data (line 8) is supposed to contain the data that the report RMKKVZ00 retrieves.

In line 10 to 13, the selections are defined, and they can be found in the report RMKKVZ00 in the same format (name and type or reference field respectively). For simplicity reasons, no checks of the input are defined here.

In line 15 to 20, the content of the selection screen is stored into the table seltab.

In line 22 to 26, the call mode for the ALV is set. In detail, the data shall not be presented (display=space), the metadata shall not be read (metadata=space), the data shall be read (data=,X') and the retrieved data shall be stored in a table of structure test_structure. The class cl_salv_bs_runtime$_{13}$ info makes use of the ABAP memory to store this information.

In line 28, the report RMKKVZ00 is called darkly. The selection data is transferred via the table seltab.

In line 30 to 34 the data that has been retrieved by report RMKKVZ00 is stored in the data table t_data using the class cl_salv_bs_runtime_info. Again this class makes use of the ABAP memory.

Following line 34, additional coding may be specified to further process the data table t_data, as it would be the case e.g. for Queries. It is important that report RMKKVZ00 has retrieved the content of the data table without however producing its own screens (selection screen, result list, messages).

Using this pattern, there is no problem to create an InfoSet that encapsulates the report RMKKVZ00 and makes use of a data retrieval program that follows the sample described above. The technique how to define InfoSets and Queries is not described here, because this is completely part of the settled InfoSet Query.

As describe above, the ALV is able to visualize either flat lists (tables) or hierarchical sequential lists header/item lists). Flat lists are by far the more important list type. However, hierarchical sequential lists, as they are produced by the ALV, serve to get a clearly arranged overview of the data. The features are:

The hierarchy consists of exactly two levels: headers and items. Additional levels are not supported.

Header data and item data are transferred to the ALV in two separated tables.

The connection between the header data and the item data is established by specifying fields of both tables that have to have equal values.

Thus a flat representation of the data can easily be gained by linking the tables for the header and the item data by a left outer join as it is known from database tables (canonical form). The advantage of this flat format is that it can be presented by all user interfaces, whereas the hierarchical presentation imposes special requirements on the user interface. The encapsulation by an InfoSet makes use of the flat structure. So the Query does not reproduce exactly the output of the report, because the retrieved data are available in a flattened version only. However, the resulting data will eventually be the same.

Basically, the above algorithm can be utilized with hierarchical sequential lists provided that the type of data retrieval be appropriately adapted. Such adaptation requires that the structure of the InfoSet contains the structures of the header and the item data, the ALV delivers header and position data separately, and after retrieving the data, the header and item data have to be combined and stored into the result table.

The following example describes the data retrieval of an InfoSet for hierarchical sequential lists. The example makes use of the report BALVHD01.

EXAMPLE 2

Hierarchical Sequential List

```
01 PROGRAM test.
02
03 TABLES hierseq.
04
05 DATA:   scarr       TYPE scarr,
```

```
06          seltab      TYPE TABLE OF rsparams,
07          t_data_h    TYPE TABLE OF hierseq_h,
08          s_data_h    TYPE hierseq_h,
09          t_data_l    TYPE TABLE OF hierseq_l,
10          s_data_l    TYPE hierseq_l,
11          t_data      TYPE TABLE OF hierseq.
12
13 SELECT-OPTIONS: carrid FOR scarr-carrid.
14 PARAMETERS:   p_maxrow TYPE i DEFAULT '50',
15               p_vari   TYPE disvariant-variant
16                    . . .
17
18 CALL FUNCTION 'RS_REFRESH_FROM_SELECTOPTIONS'
19    EXPORTING curr_report    = sy-repid
20    TABLES    selection_table = seltab.
21 DELETE seltab WHERE kind   = 'S'
22                     AND sign    IS INITIAL
23                     AND option IS INITIAL.
24
25 cl_salv_bs_runtime_info=>clear_all( ).
26 cl_salv_bs_runtime_info=>set( EXPORTING   display        = space
27                                           metadata       = space
28                                           data           = 'X'
29                                           structure      = 'HIERSEQ_H'
30                                           structure_line = 'HIERSEQ_L' ).
31
32 SUBMIT balvhd01 WITH SELECTION-TABLE seltab AND RETURN.
33
34 cl_salv_bs_runtime_info=>get_data( IMPORTING  t_data      = t_data_h
35                                              t_data_line = t_data_l ).
36 cl_salv_bs_runtime_info=>clear_all( ).
37
38 LOOP AT t_data_h INTO s_data_h.
39    CLEAR hierseq.
40    hierseq-carrid_h      = s_data_h-carrid.
41    hierseq-carrname_h    = s_data_h-carrname.
42    hierseq-currcode_h    = s_data_h-currcode.
43    hierseq-url_h         = s_data_h-url.
44    LOOP AT t_data_l INTO s_data_l WHERE carrid = s_data_h-carrid .
45       hierseq-connid_l      = s_data_l-connid.
46       hierseq-countryfr_l   = s_data_l-countryfr.
47       hierseq-cityfrom_l    = s_data_l-cityfrom.
48       hierseq-airpfrom_l    = s_data_l-airpfrom.
49       hierseq-countryto_l   = s_data_l-countryto.
50       hierseq-cityto_l      = s_data_l-cityto.
51       hierseq-airpto_l      = s_data_l-airpto.
52       hierseq-fltime_l      = s_data_l-fltime.
53       hierseq-deptime_l     = s_data_l-deptime.
54       hierseq-arrtime_l     = s_data_l-arrtime.
55       hierseq-distance_l    = s_data_l-distance.
56       hierseq-distid_l      = s_data_l-distid.
57       hierseq-fltype_l      = s_data_l-fltype.
58       hierseq-period_l      = s_data_l-period.
59       APPEND hierseq TO t_data.
60    ENDLOOP.
61    IF sy-subrc <> 0.
62       APPEND hierseq TO t_data.
63    ENDIF.
64 ENDLOOP.
65
66 BREAK-POINT.     "look at the content of t_data
```

The InfoSet is defined using the structure hierseq. This structure has to contain both header and item data.

Besides the table t_data (line 11) for the result, two additional tables t_data_h (line 07) and t_data_l (line 09) for the header and item data are required. The corresponding structures hierseq_h and hierseq_l have to be defined in the Data Dictionary as well.

The definition of the selection criterion and the extracting of these from the selection screen selections (line 13 to 23) takes place in the same way as described in Example 1.

In line 25 to 30, the call mode for the ALV is set. The procedure via the memory is similar; the only difference is that now the two structures for header and item data are transferred.

The data transfer of the header and item data is done in line 34 to 36.

In line 38 to 64, the header and item data are combined into the result table. Knowledge about all the three structures is required here. Furthermore it has to be known which fields link the header and item data. The where-condition of the loop statement in line 44 is based on this information.

Lines 61 to 63 are of special importance. They ensure that a record is transferred to the result table even if no corresponding record in the item table exists. This corresponds to a left outer join of the header and the item table.

The preconditions for the above mentioned procedure can be formulated more generically, if a generic function to retrieve data is used instead of the report.

A prerequisite is that a function to retrieve data by a generic application must be called. More specifically, the function must be executable without a UI (SAP GUI); the number and the type of the import parameter have to be known (these parameters have to be transferred to the function); the retrieved data must be transferable (e.g. by exporting parameters or by using the ALV technique described above); and in addition to the data, also the metadata (name, type and properties of the contained fields) has to be known.

Figure 5:
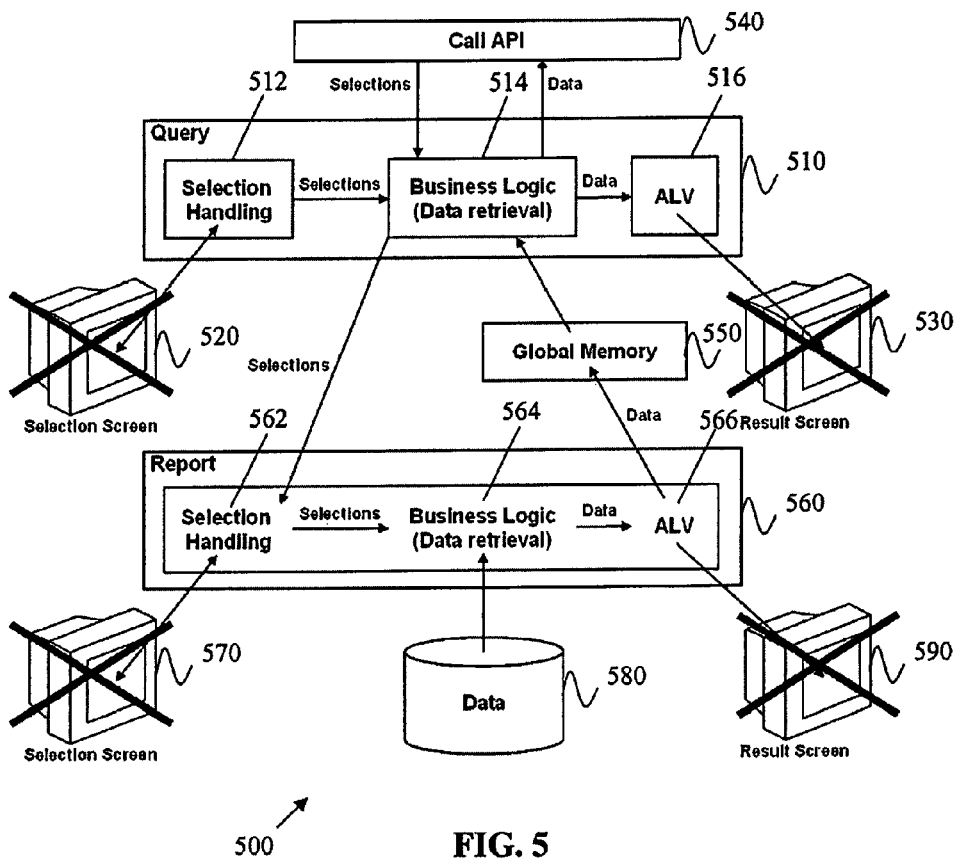
FIG. 5 is a diagram illustrating a call of a data retrieval component of a query via an InfoSet API and a dark call of a report.

FIG. 5 is a diagram 500 that illustrates a call of the data retrieval component 514 of a query 510 via an InfoSet API 540. The data retrieval 514 of the query 510 retrieves data by dark calling a report 560 with no UI on either the query 510 or the report 560 (i.e., a selection screen 520, 570 or a result screen 530, 590 are not required or used by either of the query 510 or the report 560). The dark call from the data retrieval component 514 to a selection handling component 562 obviates the need for the use of the corresponding selection screen 570. The dark call causes business logic 564 to retrieve the requested data from data source 580. After this data is retrieved, instead of the data being render in the result screen 590 via an ALV 566, the data is persisted in a global memory 550. The data persisted in the global memory 550 is then made available to the data retrieval component 514 which then responds to the InfoSet API 540 call.

Generally speaking, a program or a function that fulfills the above mentioned prerequisites can be encapsulated by an InfoSet using the above described algorithm. Depending on the kind of program, the algorithm has to be adapted only with respect to the data retrieval within the InfoSet.

Reusing the business logic is desirable not only for classical R/3 reports, but in many cases also for transactions. However transactions can additionally contain functions that manipulate data. These parts of the transactions are not accessible via the described procedure. Thus only that part of a transaction can be encapsulated that is executed before the first result list is displayed.

On the other hand there are so called report transactions that mainly consist of a report for which a transaction code and a special report variant are defined if appropriate. In many cases, the report that is called within the report transaction cannot be called directly.

So report transactions are a second important candidate for the encapsulation using the above-described algorithm. The main difference compared to a report is the kind of the dark call and the parameter passing to this call.

For reports, the command SUBMIT is used, and the parameters are transferred using a table (see Example 1, line 28). Filling that table from the selection screen is relatively simple (see Example 1, line 15 to 20).

For report transactions, the command CALL TRANSACTION (in the batch input mode) is used for the execution. The parameters have to be transferred using a batch input command table. Creating that command table is by far more complicated than filling the parameter table for reports.

Apart from the kind of data retrieval, the above-described algorithm is also applicable.

Assume that report RMKKVZ00 is also available as a report transaction TR_RMKKVZ00. In the following example, the structure of a data retrieval program of the InfoSet is described.

EXAMPLE 3

Supplier List as a Transaction

```
001 PROGRAM test.
002
003 TYPE-POOLS: sscr.
004
005 TABLES test_structure.
006
007 DATA:    lfm1            TYPE lfm1,
008          lfa1            TYPE lfa1,
009          seltab          TYPE TABLE OF rsparams,
010          bdcdata         TYPE bdcdata,
011          bdcdatatab      TYPE TABLE OF bdcdata,
012          bdcmesstab      TYPE TABLE OF bdcmsgcoll,
013          restrict        TYPE sscr_restrict,
014          sscr_opt_list   TYPE sscr_opt_list,
015          sscr_ass        TYPE sscr_ass,
016          dynpchn         TYPE iqxtdynpchn,
017          dynpsel         TYPE iqxtdynpsel,
018          t_data          TYPE TABLE OF test_structure.
```

-continued

```
019
020 SELECT-OPTIONS:   i_lifnr FOR lfm1-lifnr NO-EXTENSION,
021                   i_ekorg FOR lfm1-ekorg NO-EXTENSION MEMORY ID eko,
022                   i_sortl FOR lfa1-sortl NO-EXTENSION,
023                   i_ktokk FOR lfa1-ktokk NO-EXTENSION.
024
025 CALL FUNCTION 'RS_REFRESH_FROM_SELECTOPTIONS'
026    EXPORTING curr_report    = sy-repid
027    TABLES    selection_table = seltab.
028 DELETE seltab WHERE kind  = 'S'
029                   AND sign   IS INITIAL
030                   AND option IS INITIAL.
031
032 cl_salv_bs_runtime_info=>clear_all( ).
033 cl_salv_bs_runtime_info=>set( display   = space
034                                metadata  = space
035                                data      = 'X'
036                                structure = 'TEST_STRUCTURE' ).
037
038 bdcdata-program  = 'RMKKVZ00'.
039 bdcdata-dynpro   = '1000'.
040 bdcdata-dynbegin = 'X'.
041 APPEND bdcdata TO bdcdatatab.
042 PERFORM bdc_selopt USING 'I_LIFNR'.
043 PERFORM bdc_selopt USING 'I_EKORG'.
044 PERFORM bdc_selopt USING 'I_SORTL'.
045 PERFORM bdc_selopt USING 'I_KTOKK'.
046 PERFORM bdc_okcode USING 'BDC_OKCODE' '=ONLI'.
047
048 CALL TRANSACTION 'TR_RMKKVZ00' USING bdcdatatab
049                   MODE 'E' UPDATE 'L'
050                   MESSAGES INTO bdcmesstab.
051 TRY.
052    cl_salv_bs_runtime_info=>get_data( IMPORTING t_data = t_data ).
053 CATCH cx_salv_bs_sc_runtime_info.
054 ENDTRY.
055 cl_salv_bs_runtime_info=>clear_all( ).
056
057 BREAK-POINT.       "look at the content of t_data
058
059 *&---------------------------------------------------------------*
060 *&      Form bdc_selopt
061 *&---------------------------------------------------------------*
062 FORM bdc_selopt USING p_name TYPE rsscr_name.
063
064 DATA:  l_selopt TYPE rsparams,
065        l_name   TYPE progname.
066    READ TABLE seltab INTO l_selopt WITH KEY selname = p_name.
067    IF sy-subrc <> 0.
068       EXIT.
069    ENDIF.
070    CASE l_selopt-kind.
071    WHEN 'P'.
072       PERFORM bdc_field USING p_name l_selopt-low.
073    WHEN 'S'.
074       CONCATENATE p_name '-LOW' INTO l_name.
075       PERFORM bdc_field USING l_name l_selopt-low.
076       CONCATENATE p_name '-HIGH' INTO l_name.
077       PERFORM bdc_field USING l_name l_selopt-high.
078    ENDCASE.
079
080 ENDFORM.                    "bdc_selopt
081
082 *&---------------------------------------------------------------*
083 *&      Form bdc_field
084 *&---------------------------------------------------------------*
085 FORM bdc_field USING fnam fval.
086
087 DATA: l_data TYPE REF TO data.
088 FIELD-SYMBOLS: <l_data> TYPE ANY.
089    IF fval <> '/'.
090       ASSIGN (fnam) TO <l_data>.
091       CREATE DATA l_data LIKE <l_data>.
092       ASSIGN l_data->* TO <l_data>.
093       <l_data> = fval.
094       IF <l_data> IS NOT INITIAL.
095          CLEAR bdcdata.
096          bdcdata-fnam = fnam.
097          WRITE <l_data> TO bdcdata-fval.
```

-continued

```
098         APPEND bdcdata TO bdcdatatab.
099       ENDIF.
100     ENDIF.
101
102 ENDFORM.                    "bdc_field
103
104 *&---------------------------------------------------------------------*
105 *&      Form bdc_okcode
106 *&---------------------------------------------------------------------*
107 FORM bdc_okcode USING fnam fval.
108
109     CLEAR bdcdata.
110     bdcdata-fnam = fnam.
111     bdcdata-fval = fval.
112     APPEND bdcdata TO bdcdatatab.
113
114 ENDFORM.                    "bdc_okcode
```

It will be noted that some parts of the program are similarly structured as in Example 1.

Line 20 to 30

Definition of the selections and reading the content of the selection screen.

Line 32 to 36

Setting the call mode of the ALV.

Line 51 to 55

The data transfer into the result table is done in line 51 to 55.

Filling the batch input command table is described in line 38 to 46 and 59 to 114. The technique of batch input is not described in detail here, because it is a standard technology in SAP systems.

Calling the report transaction in batch input mode is done in line 48 to 50.

A second sample for encapsulating according to above-described algorithm relates to data sources, which are used to transfer data out of a transactional system into a business warehouse system. Data sources can consist of function modules for the data retrieval, that run without the use of a UI, for which the selections are specified via importing parameters, and which provide the retrieved data in an exporting parameter (table).

The interface of these functions may not be freely defined, but has to follow given conventions and has to be stored in a special repository. Thus the metadata are available as well, so that all requirements are fulfilled. A concrete sample will not be discussed here.

The above-described algorithm can be implemented using existing means (ABAP development environment, InfoSet query, special call mode of the ALV). However, the development efforts can be high because a structure, an InfoSet and a query have to be created manually. In particular for the creation of the structure, the coding of the report has to be analyzed. In the best case, the ALV is called with a data dictionary structure that describes the data (metadata). In many cases, such a structure cannot be used because, for example, additional information is transferred to the ALV that does not appear in the output. Furthermore, it is possible to specify the metadata as a field catalog, i.e. without using a structure. Then, an adequate structure has to be defined in the data dictionary, which is a possibly complex and error-prone process. Once the structure is present, the InfoSet and the query can be created using fixed rules. When defining the InfoSet, some knowledge about the names and the types of parameters of the report selection screen is required, because in the InfoSet, corresponding parameters have to be incorporated.

In order to ensure that the above steps can be supported by software, several considerations need to be taken into account.

The required structure can be generated.

The ALV has available not only the data, but also the metadata, the so-called field catalog. The field catalog contains all required information to generate a structure. So in case the field catalog of an ALV call can be identified, then generating an adequate structure is possible. Taking over the field catalog can be carried out analogously to taking over the data itself.

The required InfoSet can be generated.

The following applied regarding the components of an InfoSet.

Data dictionary structure see previous item

List of the fields

This list can be derived from the structure.

List of the selections including the necessary checks.

The report has to be analyzed. There are several function modules and functions of the ABAP development environment respectively, which allow detecting all information about the parameters of a selection screen (name, text, type, properties, position on the screen, etc.). So it is possible to analyze the selection screen of a report using software and to determine a list of all existing parameters.

Detecting the check coding for the parameters of a report is difficult and not possible by acceptable efforts, in particular regarding the syntactical and semantical transformations required to integrate that coding into the InfoSet.

Therefore, the generation of the InfoSet does not include the creation of the check coding. Here, manual post-processing is necessary.

Data retrieval program

The data retrieval program has a fixed structure and can be provided. The information is needed whether it is a report or a report transaction and whether the result list is flat or hierarchical sequential.

The Query can be generated.

A Query can be generated, that shows all selections of the InfoSet on the selection screen and displays all fields of the structure in the output.

The technical infrastructure to generate structures, InfoSets and queries is available (ABAP development environment and InfoSet API respectively). A completely automated procedure is often not feasible, but instead a semi-automated procedure where discrete steps can be executed can be utilized. The result of these steps can be checked and adjusted by a user, where appropriate.

A second algorithm can be employed in connection with the creation of a report InfoSet and a standard query. Such an algorithm can comprise:
1. Selecting the report and the intended output
   a. The report that is supposed to be encapsulated is executed and provided with selections that lead to the intended output. This is of particular relevance in case the report supports output of different structure, depending on the selection values. Per InfoSet, only one of these structures can be supported. (→by the user)
   b. As a byproduct of the execution, the ALV metadata can be computed. (→automated)
   c. For report transactions, a batch input table is recorded when executing the report. This table is used later on to create the batch input command table within the data retrieval program. (→automated)
2. Creating the structure
   a. Those metadata that are relevant ALV internally only are deleted from the ALV metadata. The remaining metadata are used to create a suggestion for the structure to be generated. (→automated)
   b. The user may check the suggested structure. Deleting fields is allowed, but no adding of fields and no changes to the field properties. (→by the user)
   c. Subsequently, the structure can be generated. (→automated)
3. Creating the InfoSet
   a. Based on the generated structure and the analysis of the selection screen of the report, a suggestion for the InfoSet is provided. This suggestion includes the list of selections (without checks), the field list and the data retrieval program. (→automated)
   b. The user may check the suggested selections. Selections may be deleted, but no new selections may be added and no properties of selections may be changed. (→by the user)
   c. The user may specify check coding for the selections. The technique used here (assignment of a check class) is described below. (→by the user)
   d. The user may specify fixed values for selections and hide these selections. Thus e.g. a particular output of the report can be enforced or the selection screen can be simplified. The technique used here (assignment of a check class) will be discussed below. (→by the user)
   e. The field list and the data retrieval program can be derived from the structure, the selections and the check coding. The InfoSet can be generated. (→automated)
4. Creating the Query
   a. A Query (Standard Query) that displays all fields of the InfoSet and thus reproduces the output of the encapsulated report can be generated. (→automated)

The described procedure can be implemented in a separated transaction.

The standard query encapsulates the report. Via the InfoSet API, this query can be called in a mode in which only the data retrieval is executed, i.e. all selections are preset and the retrieved data are returned. Thus an application can make use of the standard query to retrieve the data and present them hereafter e.g. in a web user interface. Additionally, the InfoSet API provides functions to access the metadata of a query, e.g. the names, texts and properties of the fields of the data table. Thus generic applications are possible.

As mentioned above, the check logic for the selections cannot be derived automatically from the report. Here it is necessary to both analyze the report and re-encode that logic. In order to avoid a special maintenance tool for this check coding, a generic interface has been designed. This can be done easily, because there are generic structures for the values of selections, so that the check methods can always work on the same structures. Assigning the check coding is achieved by assigning a class that implements the above mentioned interface. This class can be implemented using the standard means of the development environment.

The check class can also be used to set fixed values for selections.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a tangible machine-readable storing medium embodying instructions that when performed by one or more machines result in operations comprising:
   calling, using a call by a first user interface using an application programming interface, a query, the call defining selections for data retrieval;
   passing, by a first business logic component of the query, the selections to a report, the report comprising a previously generated report or report transaction, the passing of the selections by the query to the report being representative of a dark call of the report, the dark call comprising selections from a query rather than selections being specified on a second user interface that can directly call the report without calling an intermediate query between the second user interface and the report;
   obtaining, by a second business logic component of the report and from a data source, data in response to receipt of the selections from the query;
   persisting the obtained data in a global memory, the global memory persisting the data to enable access of the data by queries in multiple sessions;
   retrieving, by the first business logic component of the query and from the global memory, the persisted data; and
   responding, by the query, to the call with the persisted data retrieved from the global memory;
   displaying the responded retrieved data at the first user interface,
   wherein the second business logic component remains unchanged when the first user interface is modified.

2. An article as in claim 1, wherein:
   the report is an advanced business application programming (ABAP) report; and
   the modification occurs to make the user interface compatible with a new operating system.

3. An article as in claim 1, wherein:
   the call bypasses a selection handling component in the query;
   the query comprises a first selection handling component, the first business logic component, and a first presentation component; and
   the report comprises a second selection handling component, the second business logic component, and a second presentation component.

4. An article as in claim 1, wherein the article embodies further instructions that when performed by one or more machines result in operations comprising:
   presenting, to a user and in response to the call, the retrieved persisted data.

5. An article as in claim 1, wherein the article embodies further instructions that when performed by one or more machines result in operations comprising:
   defining a structure in a data dictionary that characterizes the data is to be presented by the report;
   defining an InfoSet that encapsulates the report based on the structure;
   automatically defining, based on the defined InfoSet, the query such that the query contains all fields of the InfoSet,
   wherein the calling of the query processes only the first business logic of the query while the application programming interface provides the selections rather than the selections being provided by a user interface associated with the query, and
   wherein the report is a pre-defined report.

6. An article as in claim 5, wherein the application programming interface for the InfoSet uses a data dictionary to characterize how the data is to be presented in the report.

7. An article as in claim 1, wherein the application programming interface provides metadata of the report and execution of business logic.

8. A method for implementation by one or more data processors comprising:
   calling, using a call by an application programming interface using at least one data processor, a query, the call defining selections for data retrieval;
   passing, by a first data retrieval component of the query using at least one data processor, the selections to a report, the report comprising a previously generated report or report transaction;
   obtaining, by a second data retrieval component of the report and from a data source and using at least one data processor, data in response to receipt of the selections from the query;
   persisting the obtained data in a global memory, the global memory persisting the data to enable access of the data by queries in multiple sessions;
   retrieving, by the first data retrieval component of the query and from the global memory and using at least one data processor, the persisted data; and
   responding, by the query using at least one data processor, to the API call with the persisted data retrieved from the global memory,
   wherein the second data retrieval component remains unchanged irrespective of a modification of a user interface displaying the retrieved data, the modification of the user interface occurring when an operating system associated with the user interface is changed.

9. A method as in claim 8, wherein the report is an ABAP report.

10. A method as in claim 8, wherein the call bypasses a selection handling component in the query.

11. A method as in claim 8, further comprising:
   presenting, by at least one data processor, data responsive to the call to a user.

12. A method as in claim 8, wherein the application programm interface is for an InfoSet.

13. A method as in claim 8, wherein the InfoSet application programming interface uses a data dictionary to characterize how the data is to be presented in the report.

14. A method as in claim 8, wherein the application programming interface provides metadata of the report and execution of business logic.

15. A method for implementation by one or more data processors comprising:
   initiating, by at least one data processor, execution of a report, the output of the report being pre-defined and based on provided selections, data responsive to the provided selections being displayed using a first user interface, the report comprising a second selection handling component, the second business logic component, and a second presentation component;

computing, by at least one data processor, automated list viewer (ALV). metadata during execution of the report;

deleting, by at least one data processor, ALV metadata to suppress presentation of an associated result list;

generating, by at least one data processor, a structure for an InfoSet based on remaining non-deleted ALV metadata;

generating, by at least one data processor, suggestions for the InfoSet based on the generated structure and an analysis of a selection screen of the report;

generating, by at least one data processor, the InfoSet based on the generated structure and the generated suggestions; and generating, by at least one data processor, a query displaying all fields of the InfoSet, the query comprising a first selection handling component, the first business logic component, and a first presentation component, wherein the provided selections are passed by the query to the report via a dark call such that the provided selections are directly provided to the report by the query rather than the provided selections being specified on a user interface that directly passes the provided selections to the report without passing the provided selections via an intermediate query between the second user interface and the report, and wherein the second business logic component remains unchanged when the first user interface is modified to be compatible with a new operating system.

16. A method for encapsulating an a pre-defined report by an InfoSet, the method being implemented by one or more data processors and comprising:

defining, by at least one data processor, a structure in a data dictionary that characterizes data presented by the pre-defined report, the report comprising a second selection handling component, the second business logic component, and a second presentation component;

defining, by at least one data processor, the InfoSet that encapsulates the pre-defined report based on the structure;

defining, by at least one data processor, a query that contains all fields of the InfoSet, the query comprising a first selection handling component, the first business logic component, and a first presentation component; and calling, by at least one data processor, the query via an application programming interface (API) of the InfoSet so that only data retrieval is processed, wherein the second data retrieval component remains unchanged irrespective of a modification of a user interface displaying the retrieved data, the modification of the user interface occurring when an operating system associated with the user interface is changed.

17. A method as in claim 16, wherein the data presented by the pre-defined report is presented via an Automated List Viewer (ALV);

wherein the InfoSet is defined such that:

selections of the InfoSet are collected in a selection table;

a special call mode for the ALV is set in memory;

the selected table is transferred to the pre-defined report;

the ALV stores result data in the memory and does not visualize the result data; and data is retrieved from the memory and stored in an internal table of the defined structure after the report is called.

* * * * *